United States Patent [19]

Hughes et al.

[11] 4,055,324
[45] Oct. 25, 1977

[54] PLUG VALVE ASSEMBLY

[76] Inventors: John F. Hughes, 91 d'Avignon, Dollard des Ormeaux, Quebec; Stanislaw Dalkin, 3236 - 7th St., Chomedy, Quebec, both of Canada

[21] Appl. No.: 681,697

[22] Filed: Apr. 29, 1976

[51] Int. Cl.$^2$ ............................................. F16K 5/00
[52] U.S. Cl. .................................. 251/309; 251/317 F
[58] Field of Search ................ 251/309, 314, 316, 317

[56] References Cited

U.S. PATENT DOCUMENTS

| | | | |
|---|---|---|---|
| 3,111,299 | 11/1963 | Miller et al. | 251/309 |
| 3,185,179 | 5/1965 | Harautuneian | 251/309 |
| 3,266,769 | 8/1966 | Shand | 251/317 |
| 3,295,554 | 1/1967 | Huppert | 251/317 |
| 3,353,785 | 11/1967 | Eggers | 251/314 |
| 3,484,078 | 12/1969 | Haenky | 251/317 |
| 3,504,885 | 4/1970 | Hulsey | 251/317 |
| 3,848,849 | 11/1974 | Alexander | 251/314 |

*Primary Examiner* — William R. Cline
*Assistant Examiner* — H. Jay Spiegel

[57] ABSTRACT

A novel plug valve assembly is described having improved leak-resistance under high pressures. It includes a housing with inlet and outlet ports and a cylindrical valve chamber. Cylindrical valve sealing members are slidably mounted in the ports, each sealing member having a main body portion with a concave end face portion adjacent the valve chamber and an axial bore extending therethrough. The main body portion has an annular recess on the cylindrical surface thereof extending from the concave end to an annular abutment intermediate the length of the main body portion. A generally tubular resilient collar is slidably mounted on the recessed portion of the main body, this collar having a thickness substantially equal to the depth of the recess and having a concave end portion protruding beyond the concave end of the main body portion. A cylindrical valve member having a transverse port therethrough is positioned within the chamber in resiliently sealing engagement with the concave end portions of the sealing member resilient collars, and resiliently supported for rotation by a lower valve seat and an upper valve seat and sealing means, e.g. "O" ring means mounted in annular grooves formed at the top and bottom edges of said valve member, such that the "O" ring means engage both a cylindrical side wall and an end wall of the chamber and an end wall of the valve member.

7 Claims, 7 Drawing Figures

PLUG VALVE ASSEMBLY

BACKGROUND OF THE INVENTION

1. Field of the Invention

This invention relates to a valve assembly and, more particularly, to a valve seat and seal arrangement particularly suitable for plug valves operating under very high pressures.

2. Description of the Prior Art

Valves such as plug valves have long been popular as relatively inexpensive, simple and easily maintained means for controlling the flow of fluids. As these valves have been applied to systems handling high pressure fluids, various sealing problems have developed. The present invention relates to the sealing problems at the interface of the rotatable member found in such valves and the valve seats.

Prior attempts to seal the interface between the rotatable member and seats as found in plug valves have included careful machining of mating faces on each component which were then lapped together. Another system was to provide an "O" ring which was inserted in an annular groove provided in the face of the seat in concentric relation with the seat port. The careful machining technique is, of course, extremely costly, but does provide a reasonably good seal at least initially. However, it is most difficult to avoid at least some leakage under high pressures and the rotatable member can be difficult to rotate under very high pressures. Moreover, subsequent use in the presence of corrosive or erosive liquids quickly destroys the careful workmanship that has gone into the valve assembly, thereby destroying any seal obtained by the close tolerances.

The "O" ring insert has not been satisfactory because the rotation of the valve member from open to closed position of the valve or vice versa, causes the port in such rotatable member to pass over a portion of the periphery of the "O" ring, which expands into the port of such member and is then subjected to a shearing action which tends to pull the "O" ring from its seat or to destroy its sealing capabilities by a galling action. Even with this type of sealing arrangement, the costly machining technique could not be avoided as the principal sealing was still at the interface of the seat face and the rotatable member.

As an example of a more advanced attempt at a solution to the above problems, there may be mentioned Sachnik, Canadian Patent 690,218 issued July 7, 1964. It was the primary object of that patent to provide in combination with a through ported cylindrical plug valve and its enclosed ported housing, a valve seat structure which would resiliently support and constantly seal the cylindrical surface of the valve for such yielding thereof between the ports of the housing as became necessary under changes in pressures thereon under rotation, but also preventing expansion of any portions thereof into the ports of the valve and thus preventing any shearing or galling action as in the prior art structures. This involved the use of tubular valve seat members having concave end faces protruding into the valve chamber with the concaved face portions being recessed and retaining a resilient sealing ring bonded into the recess. While this system functions reasonably well under moderate pressures, the resilient sealing ring is unable to withstand the effects of very high pressures.

Part of the problem with the prior valve is that the sealing rings are serving not only a sealing function but also serve as valve seats for the positioning of the rotatable member. With such arrangement there is a substantial portion of the sealing ring which is actually exposed to the liquids under pressure and these become subject to cold flow. The result is deformation of the sealing rings with consequent leaking of the valve. In keeping with this, the patent mentions that under high pressures, the sealing ring is made of brass or bronze. Of course, when it becomes necessary to use a metal ring of this type, one is once more in the position of relying entirely upon accurate machining to provide the seal. This once more leaves open the problem of corrosive or erosive fluids under high pressure quickly destroying the careful workmanship that has gone into the manufacture of the valve.

Another valve seating assembly which has been developed to try to overcome the problems of high pressures is described in Shand, Canadian Patent 704,540 issued Feb. 23, 1965. This described a resilient annular valve seat which is pressed against the rotatable member by means of a spring. A gap is provided adjacent the resilient ring to permit some rocking thereof when the rotatable member is moved. This arrangement once again is not protected from the problems of cold flow of the plastic under high pressures and eventual leakage about the seal.

It is the object of the present invention to provide a valve assembly for use at high pressures which will avoid the difficulties inherent in the prior valves and which will permit easy turning of the rotatable member while avoiding leakage about the seals under high pressures.

SUMMARY OF THE INVENTION

In accordance with the present invention there is provided a plug valve assembly comprising a housing having aligned generally cylindrical inlet and outlet ports in the side walls thereof and a cylindrical plug valve chamber therebetween having its vertical axis normal to the axes of the ports and being closed by substantially flat end walls. Like, generally cylindrical valve sealing members are slidably mounted in the cylindrical walls of the ports, each of these sealing members having a main body portion with a concave end face portion adjacent the valve chamber and an axial bore extending therethrough. The main body portion has an annular recess on the cylindrical surface thereof extending from the concave end to an annular abutment intermediate the length of the main body portion. A generally tubular, resilient collar is slidably mounted on the recessed portion of the main body and this collar has a thickness substantially equal to the depth of the recess and has a concave end portion protruding beyond the concave end of the main body portion. A cylindrical valve member having a transverse port therethrough is positioned within the valve chamber in resiliently sealing engagement with the concave end portions of the sealing member resilient collars. The valve member is also resiliently supported for rotation by means of resilient valve seats at the top and bottom regions of the valve member, preferably in the form of "O" ring means mounted in annular grooves formed at the top and bottom regions of the valve member, such that the "O" ring means engage both a cylindrical side wall and an end wall of the chamber and an end wall of the valve member. Means are also provided to engage the valve member for rotation.

The important distinction of this invention is that the rotatable valve member is accurately seated and positioned within the valve chamber such that the resilient sealing collars serve only as a fluid seal and do not play any part in the positioning or seating of the valve member. Preferably, the rotatable valve member and the valve chamber are machined to quite close tolerances such that the gap between the cylindrical wall of the valve member and the wall of the chamber is in the range of 0.025 to 0.25 mm. These tolerances are determined largely by the intended use of the valve and the temperature changes to which it may be subjected. Thus, for a valve normally used at ambient temperatures a very small tolerance in the range of 0.025 mm can be utilized. Thus, it will be seen that the rotatable valve member is very accurately positioned and maintained within the valve chamber.

The resilient sealing collar is arranged to project only slightly beyond the main body portion of the sealing member e.g., in the order of about 0.025 to 0.25 mm. Thus, it will be seen that only a very minute portion of the resilient collar is exposed to the effects of any corrosive or erosive fluids moving through the valve under high pressures, so that the collar is almost totally unaffected by the fluid. Moreover, any tendency to cold flow by the resilient collar is virtually eliminated.

It has quite surprisingly been found that this quite simple combination of resilient sealing collar and "O" ring valve seats provide a valve which resists leakage under high pressures for a long period of time while the rotatable valve member remains extremely easy to rotate.

The valve housing and rotatable valve member are preferably made from stainless steel although they can also be made from a wide variety of other metals including mild steels, alloys, etc. The main body of the sealing member can also be conveniently made from stainless steel, but here again a wide variety of materials are possible.

The resilient sealing collar must, of course, be made from a material which is softer than the material of the rotatable valve member so that when the valve member is made from stainless steel, the resilient collar can conveniently be bronze, silicon rubber, polytetrafluoroethylene, etc. Polytetrafluoroethylene has been found to be particularly advantageous since it is highly resistent both to temperatures and chemicals and provides a very easy turning of the rotatable valve member. The sealing collar must, of course, be maintained in very tight engagement with the rotatable valve member.

The grooves for the "O" rings can be formed either in the body of the rotatable valve member itself or in the adjacent walls of the valve chamber. At the bottom of the valve member a convenient arrangement is to provide an annular groove extending into the bottom edge of the valve member such that the single groove cuts into both the side and bottom of the valve member. An "O" ring positioned within this annular groove then engages both the side and bottom walls of the valve chamber as well as side and bottom walls of the rotatable valve member, i.e. the sides of the groove.

A similar arrangement can be provided at the top edge of the valve member, although it has been found to be particularly advantageous to provide an annular groove cut into the side wall of the rotatable member in an upper region thereof for retaining an "O" ring and providing a further groove in the top wall of the chamber for retaining an "O" ring which presses down on the top wall of the rotatable valve member. The "O" rings themselves can be made of a wide variety of materials including polytetrafluoroethylene, silicon rubber, copper, etc.

Further features and advantages of the invention will appear from the following description of a particular embodiment illustrated in the accompanying drawings in which.

Figure 1:
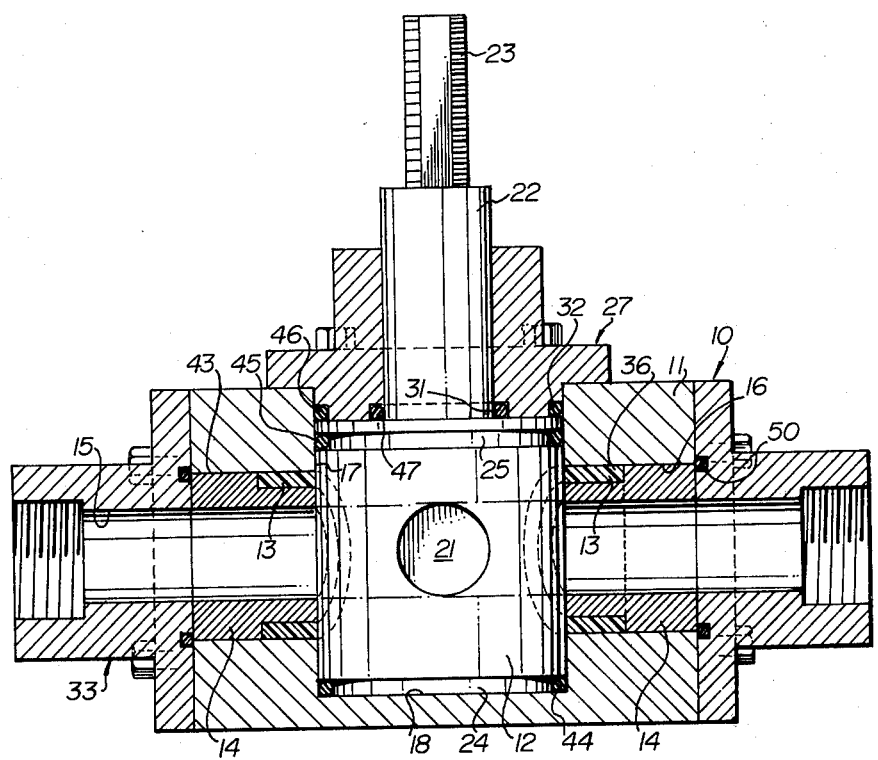
FIG. 1 is an elevational view, partially in section, of a plug valve according to the invention.
Figure 2:
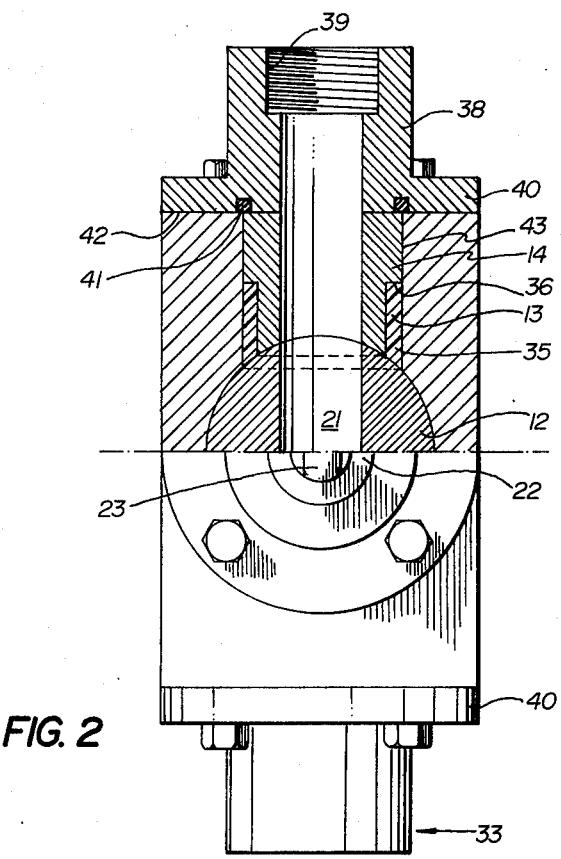
FIG. 2 is a plan view, partially in section, of the valve shown in FIG. 1.

Referring to FIG. 1, the plug valve indicated generally at 10 has a body 11, and ported plug valve member 12 rotatable relative to the body 11 and positioned between sealing collars 13 mounted on support sleeves 14. Bores extend axially through the sleeves 14 defining an inlet port 15 and an outlet port 16.

Looking at the valve assembly in greater detail, the body 11 contains a cylindrical bore with cylindrical side walls 17 and a bottom wall 18 defining a valve chamber. The top of the chamber is closed by means of a flange member 27 held in position by threaded studs. Positioned within this valve chamber is the rotatable valve member 12 having a port 21 extending therethrough. Extending from the top of the valve member 12 in a wrench head extension 22 with a threaded portion 23, whereby the valve member 12 can have the port 21 thereof rotated into and out of register with the inlet and outlet ports 15 and 16, respectively.

The valve member 12 is seated within the valve chamber by means of a series of "O" rings. To this purpose there is provided an annular groove 24 at the bottom edge of the valve member within which is positioned a Teflon "O" ring 44. In an upper region of the valve member 12 is a further annular groove 25 extending into the side wall and this holds a further Teflon "O" ring 45.

The top flange member 27 has a generally tubular body 28 with a peripheral flange 30 and a flat bottom face 29. Machined into the flat bottom face are a pair of annular grooves 31 and 32 for retaining the "O" rings 47 and 46 respectively. These engage the top face of the valve member 12, with the flange member 27 being retained in position by means of threaded studs passing through holes in the peripheral flange 30 and into tapped holes 20 in top face 19 of the valve body 11.

Figure 3:
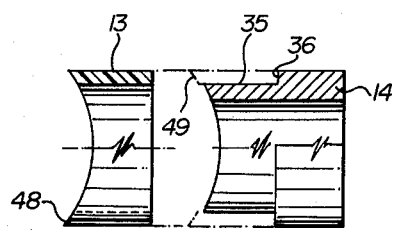
FIG. 3 is an exploded view in partial section of the valve sealing members.
Figure 4:
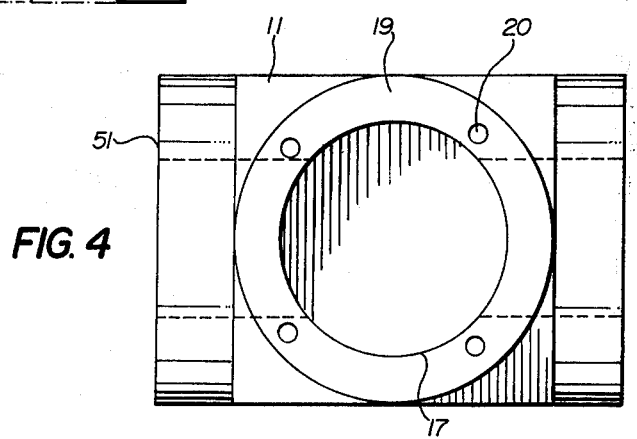
FIG. 4 is a plan view of the main valve housing.
Figure 5:
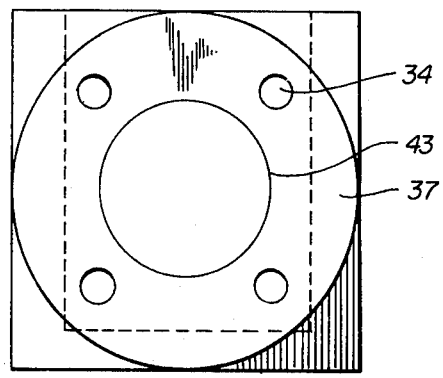
FIG. 5 is an end elevation of the main valve housing.
Figure 6:
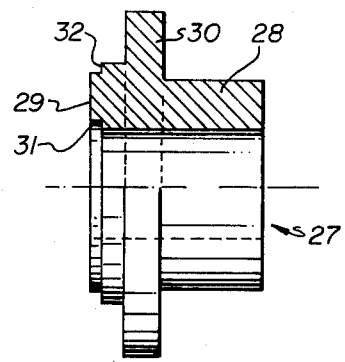
FIG. 6 is an elevation view, partially in section, of a top cover flange for the valve chamber.
Figure 7:
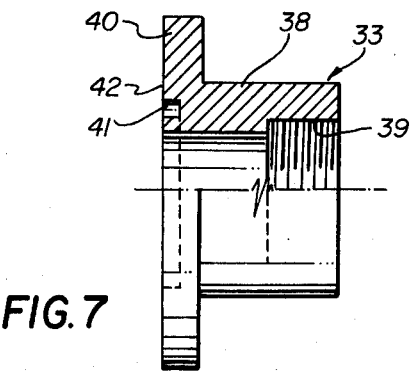
FIG. 7 is an elevation view, partially in section, of a flange for the inlet and outlet ports.

As will be seen from FIG. 3, each valve seal is in the form of a collar 13 having a concave end face 48 and this is supported by a sliding fit on a skirt portion 35 of the support sleeve 14, while abutting against face 36. The support sleeve 14 also has a concave end face 49 with the concave end of the seal 13 extending slightly beyond the concave end of the support sleeve 14, e.g. about 0.025 to 0.25 mm (0.001 to 0.010inches).

The sealing assemblies 13, 14 fit within cylindrical bores 43 of the valve body with the concave end face 48 of each sealing collar 13 directly engaging the valve member 12. These are held in engagement with the valve member 12 by means of the end flange members 33. Each flange 33 has a main cylindrical body portion 38 having a threaded connection 39 at one end for an inlet or outlet pipe and a peripheral flange 40 at the opposite end. The flange end defines a flat face 42 which mates with the flat face 33 of the end of the valve body 11. The face 42 also includes an annular groove 41 containing an "O" ring 50, serving as a further liquid seal. The flange is held in position by means of threaded studs which pass through holes in peripheral flange 40 and into tapped holes 34 in the face 37 of valve body 11.

While the above description illustrates a valve assembly with a pair axially aligned inlet and outlet ports, the invention also applies to multi-way valves. It particularly applies to three-way valves in which the embodiment shown in FIGS. 1–7 above includes a third port and seal arranged perpendicular to the inlet and outlet ports shown and a T-shaped port in the rotatable valve member.

It will also be understood that means other than "O" rings can be used as valve seats for the cylindrical valve member. Any type of valve seat arrangement can be used which is capable of accurately positioning the valve member for rotation while engaging the valve seals, while also providing an adequate seals at the top and bottom of the valve member to prevent leakage of liquid. For example, the bottom valve seat can be in the form of a TEFLON disk upon which the cylindrical valve member rests.

Various and other forms of the invention will become apparent to those skilled in the art to which it pertains without departing from the spirit and scope thereof when viewed in conjunction with the following claims.

We claim:

1. A plug valve assembly comprising:
   a. a housing having aligned generally cylindrical inlet and outlet ports in the side walls thereof, a cylindrical valve chamber therebetween having its vertical axis normal to the axes of said ports and being closed by end walls;
   b. generally cylindrical valve sealing members slidably mounted in the cylindrical walls of said ports, each said sealing member having a main body portion with a concave end face portion adjacent said valve chamber and an axial bore extending therethrough, said main body portion having an annular recess on the cylindrical surface thereof extending from said concave end to an annular abutment intermediate the length of said main body portion and a generally tubular resilient collar slidably mounted on the recessed portion of said main body, said collar having a thickness substantially equal to the depth of said recess and having a concave end portion protruding beyond the concave end of the main body portion by a distance of about 0.025 to 0.25 mm;
   c. a cylindrical valve member having at least one transverse port therethrough positioned within said chamber with an annular gap of about 0.025 to 0.25 mm between the cylindrical valve member and the cylindrical wall of the valve chamber, said valve member being in resiliently sealing engagement with the concave end portions of the sealing member resilient collars, and resiliently supported for rotation by resilient valve seating and sealing members at the top and bottom regions of said valve member; and
   d. means to engage said valve member and rotate same while thus supported.

2. A valve assembly according to claim 1 wherein the valve is a two-way valve with axially inlet and outlet ports and a single port extending through said valve member.

3. A valve assembly according to claim 1 wherein said cylindrical valve member has an annular groove at the bottom edge thereof extending into the bottom and side walls thereof, said groove retaining a resilient "O" ring which engages the groove and the bottom and side walls of the valve chamber.

4. A valve assembly according to claim 1 wherein said cylindrical valve member has an annular groove in an upper region of the side wall thereof, said groove retaining a resilient "O" ring engaging the side wall of the chamber.

5. A valve assembly according to claim 4 wherein the top end wall of the valve chamber has at least one annular groove, said groove retaining a resilient "O" ring engaging the top of the valve member.

6. A valve assembly according to claim 5 wherein the top of the valve chamber comprises a cover flange having a cylindrical extension which extends into the valve chamber and an axial bore through which passes a wrench head extension for rotation of the valve member, said cylindrical extension having an outer annular groove immediately adjacent the outer edge thereof and an inner annular groove immediately adjacent said axial bore, each said groove containing a resilient "O" ring.

7. A valve assembly according to claim 1 wherein the sealing member resilient collar is a polytetrafluoroethylene collar.

* * * * *